Nov. 9, 1965    E. J. SCHELDE    3,216,555
AUTOMATIC AUTOMOBILE SERVICING RACK
Filed July 11, 1962    3 Sheets-Sheet 1
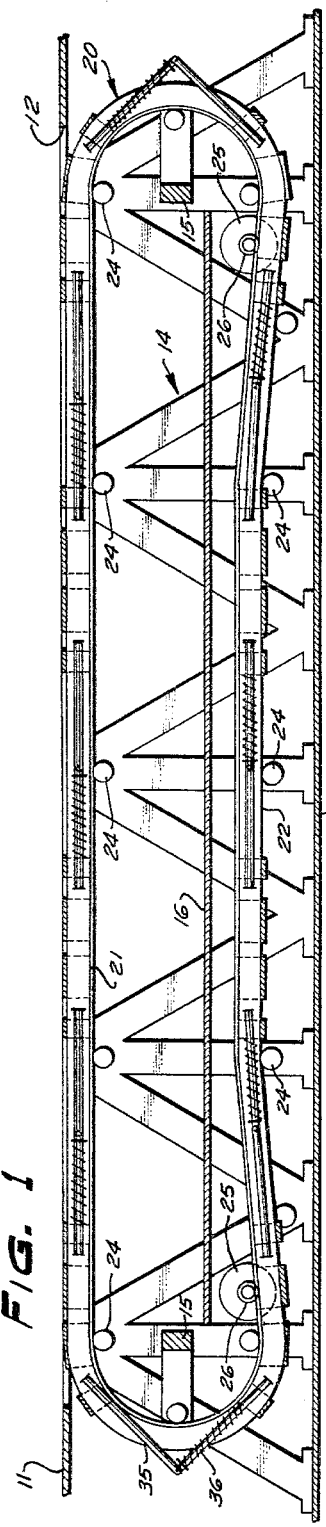
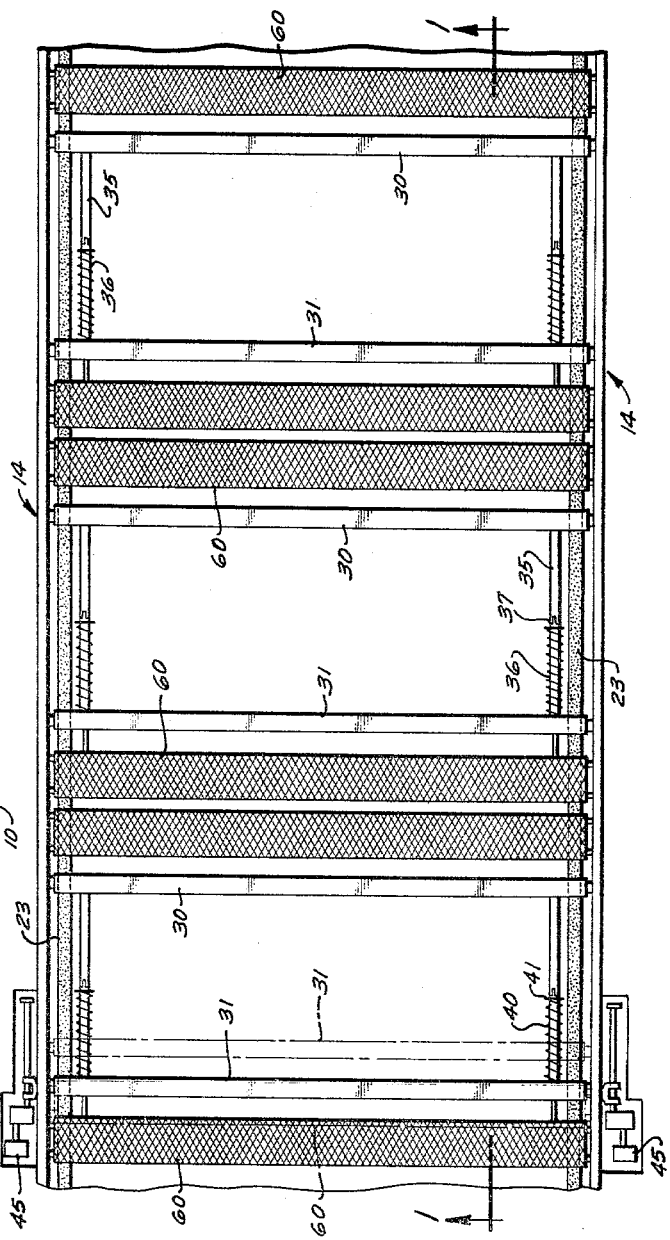
EDWIN J. SCHELDE,
INVENTOR.
BY
BUCKHORN, CHEATHAM & BLORE
ATTORNEYS Nov. 9, 1965     E. J. SCHELDE     3,216,555
AUTOMATIC AUTOMOBILE SERVICING RACK
Filed July 11, 1962     3 Sheets-Sheet 2

EDWIN J. SCHELDE,
INVENTOR.

BY

BUCKHORN, CHEATHAM & BLORE
ATTORNEYS

Nov. 9, 1965  E. J. SCHELDE  3,216,555
AUTOMATIC AUTOMOBILE SERVICING RACK
Filed July 11, 1962  3 Sheets-Sheet 3
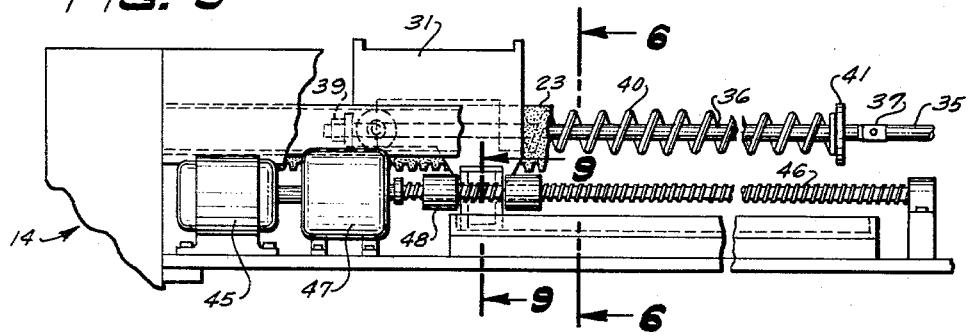
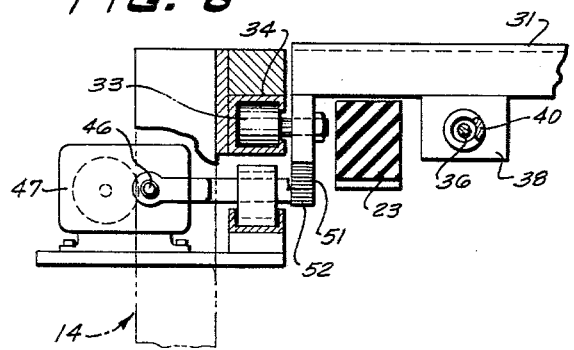
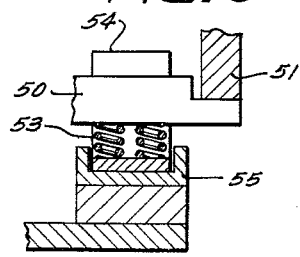
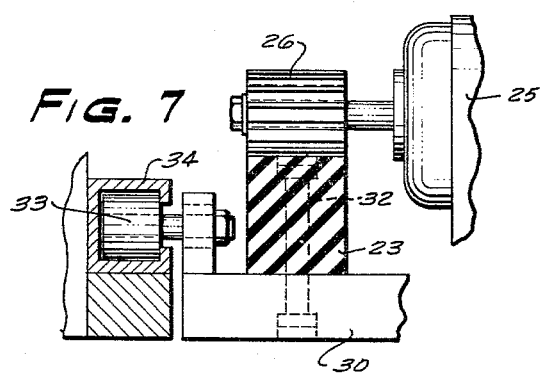
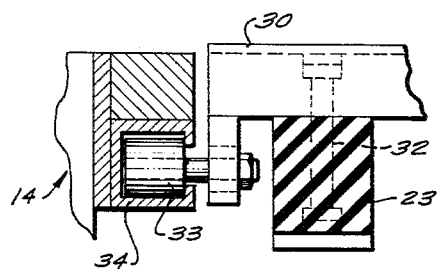
EDWIN J. SCHELDE,
INVENTOR.
BY
BUCKHORN, CHEATHAM & BLORE
ATTORNEYS

United States Patent Office 3,216,555
Patented Nov. 9, 1965

3,216,555
AUTOMATIC AUTOMOBILE SERVICING RACK
Edwin J. Schelde, 3829 N. Kirkpatrick, Portland, Oreg.
Filed July 11, 1962, Ser. No. 209,170
10 Claims. (Cl. 198—195)

The present invention comprises a vehicle servicing device. The prior art comprises means for servicing vehicles such as an open pit spanned by tracks, or of such width that a vehicle may straddle the pit, into which workmen may descend for the purpose of greasing and otherwise servicing the lower parts of the vehicle. Such pits become slippery and extremely dirty and cause a great loss of time because of the necessity of carrying materials in and out of the pits, cleaning the pits and the like. Other prior art devices have been developed including a pair of tracks mounted upon an elevating mechanism which lowers the tracks to the floor level so that a vehicle may be driven thereupon and then elevates the vehicle so that a workman may walk beneath it. Such devices are inherently dangerous since carelessness could result in the vehicle being lowered upon a workman. They are also time consuming in that various equipment must be moved under and away from the vehicle, and the tracks or other supporting means for the vehicle must be laboriously adjusted to the vehicle. The present invention comprises means whereby all materials and equipment required for servicing the vehicle may remain in position, the vehicle need not be raised and lowered, and a plurality of vehicles may be serviced at the same time, each vehicle traveling past successive operating stations where different functions may be performed.

An object of the present invention is to provide servicing means which may be easily installed in any building or structure having an upper floor upon which vehicles may move about and a lower floor separated from the upper floor by more than a man's height.

A further object of the present invention is to provide means of the foregoing character which may be readily adjusted to accommodate vehicles of different tread widths.

The objects and advantages of the present invention will be more readily apparent from inspection of the following specification taken in connection with the accompanying drawings wherein like numerals refer to like parts throughout.

In the drawings,

FIG. 1 is a longitudinal section taken substantially along line 1—1 of FIG. 2;

FIG. 2 is a partial plan view of FIG. 1;

FIG. 5 is a side elevation of the mechanism illustrated in FIG. 4;

FIG. 6 is a vertical section taken substantially along line 6—6 of FIG. 5;

FIG. 7 is a vertical section, on an enlarged scale, of a typical detail;

FIG. 8 is a vertical section, on an enlarged scale, of a detail; and

FIG. 9 is a vertical section, on an enlarged scale, taken substantially along line 9—9 of FIG. 5.

Figure 3:
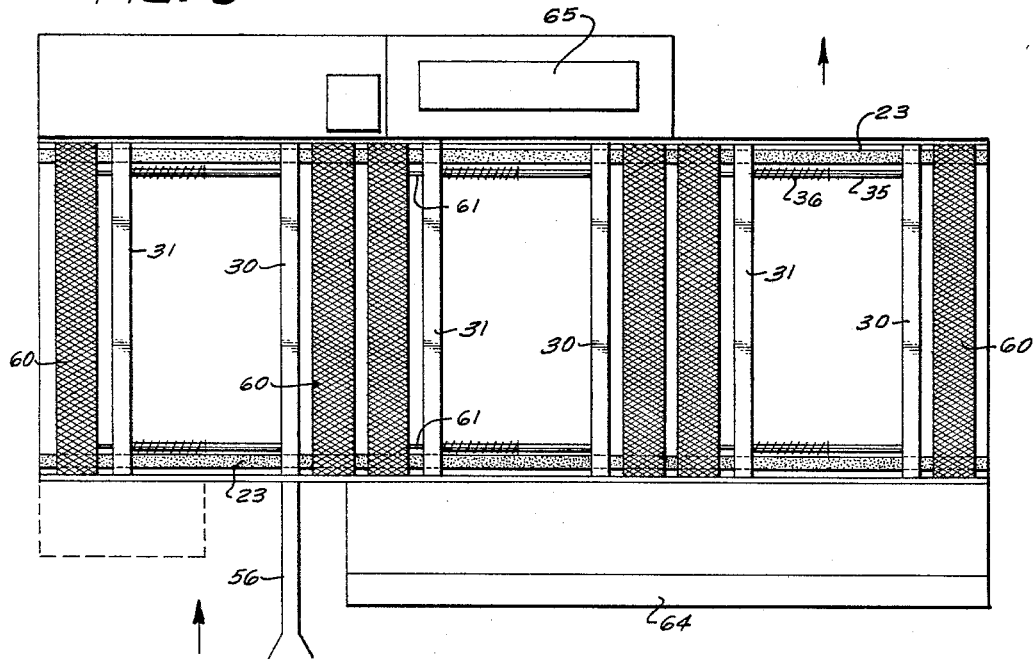
FIG. 3 is a schematic plan view showing a typical arrangement of servicing equipment in association with the invention.
Figure 4:
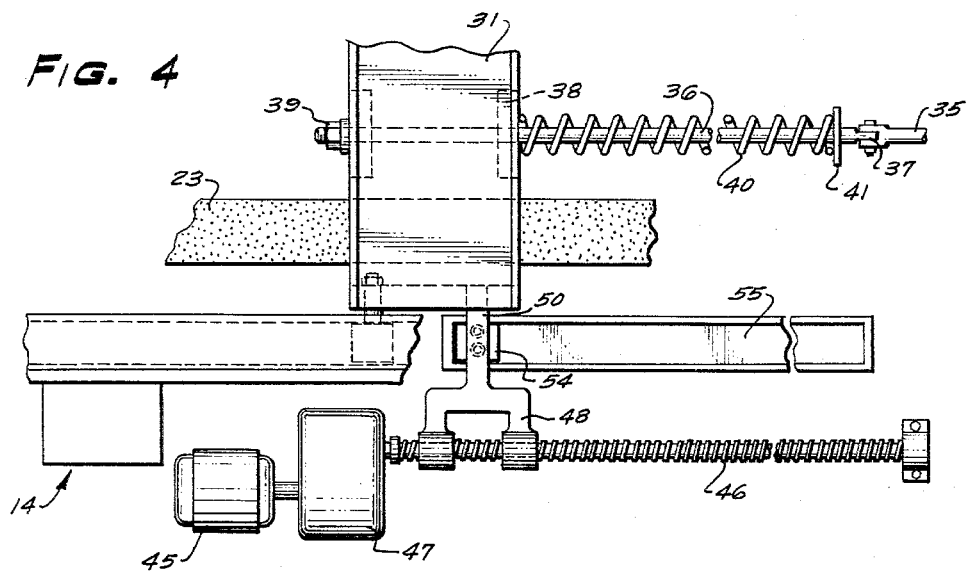
FIG. 4 is a view in plan of a portion of the mechanism on an enlarged scale and with parts broken away.

The invention comprises a frame of sufficient height to rest upon a lower floor 10 and extend upward to the level of an upper floor 11. The frame is elongated so that a plurality of vehicles may be supported thereon in side by side relation at the upper level of the frame, and is designed to be positioned beneath a pit opening 12 in the upper floor 11. The frame includes an opposed pair of side wall structures 14 which are held vertically and in parallel relation to each other by suitable cross beams such as indicated at 15, and an intermeditae flooring structure 16 is so placed as to permit a workman to move about while working on the lower portions of vehicles supported at the level of the upper floor 11.

Endless belt means 20 are supported on the frame and extend longitudinally thereof, comprising an upper flight 21 which is maintained at the level of the upper floor 11 and a lower flight 22 which is maintained in the space between the intermediate floor 16 and the lower floor 10. The endless belt means comprises a pair of flexible cog belts 23 respectively adjacent each of the opposed sidewall structures 14. The flights of the belt and the end flights thereof are suitably guided by appropriately positioned guide rollers 24 mounted on the side structures. Motive means for moving the belts are provided comprising a plurality of motors 25, the shafts of which support cog wheels 26 engaged with the cog teeth of the belts, such motors being under control of suitable switch means (not shown) whereby the belts may be moved as desired to the extend desired.

A plurality of pairs of transverse beams are connected to the belts 23 and carried thereby around the frame, each pair of beams comprising a relatively fixed beam 30 and a relatively movable beam 31. The beams extend transversely between the side structures at right angles thereto, and the movable beams 31 may be moved laterally toward and away from its associated fixed beam so that vehicles of different tread width may be driven onto the beams. The fixed beams 30 are fastened to the belts 23 by suitable bolt means 32, and a guide wheel 33 is affixed to each end respectively of each fixed beam 30 and projects therebeyond to be engaged in a guide channel 34 supported by the side structure 14 near the upper edge thereof when the fixed beams are uppermost as seen in FIG. 8. The guide channels 34 extend entirely about the frame so that the fixed beams are supported throughout their travel. The movable beams 31 are also provided with guide rollers 33 at each end, which are respectively engaged in the guide channels 34 so that they too are supported throughout their travel around the structure.

The movable beams are attached to and carried along by the fixed beams 30 through the medium of pairs of articulate connecting means each comprising a rearwardly projecting rod 35 fixed to the beam 30 and connected to a longitudinally aligned rod 36 through a hinge connection 37. The rod 36 is slidably guided in a bracket 38 depending from the movable beam 31, the rear end of the rod being threaded and engaging a nut 39 which prevents separation of the movable beam from the rod 36. A helical spring 40 is coiled about the rod 36 and held in compression between the bracket 38 and a flange 41 fixed to the rod near the hinge 37. Each movable beam may therefore be moved, by means to be described, toward its associated fixed beam against the compression of springs 40, and when released, as will appear, the springs 40 will move the movable beam back to its rearward position. The beams are normally maintained spaced apart so as to be capable of receiving a standard width automobile thereon, but they may be moved together so as to receive various narrower tread width vehicles.

Motive means for adjusting the spacing of the beams are provided at each side of the structure, adjacent the end of the opening 12 first approached by the beams as they start traveling along the upper portion of the frame, there being one at each side of the structure, but controlled to operate in unison through suitable control means (not shown). Each motive means comprises a motor 45 which drives a longitudinally extending threaded shaft 46 through the medium of a suitable gear reduction and control mechanism indicated at 47. The shaft 46 is threadedly engaged in the arms of a clevis 48 from which an actuator finger 50 projects laterally beneath the guide member 34. The finger projects into the path of a cam plate 51 fixed to the end of the movable beam and having a projection 52 at its forward edge. The trailing and forward surface of the member 51 are both inclined so that as a movable beam 31 passes the member 50 it will depress the member against the force of a pair of springs 53 mounted in a slide 54 which is guided for longitudinal movement in a guideway 55 fixed to the frame. The member 50 is thereby momentarily depressed and then snaps up behind the projection 52. It is to be appreciated that automatic means are provided in the control circuit (not shown) for arresting the motors 25 so as to halt the belt means at this point. When at this point a vehicle having its right wheels guided in a trough 56 mounted on floor 11 may be driven onto the beams, the right wheels being guided by the trough onto the fixed beams 30. If the vehicle is a standard width the left wheels will ride onto the beam 31 without further attention by the operator. However, if the vehicle is of a narrow width the motor 45 is actuated to cause the fingers 50 to move the left beam 31 into alignment with the left wheels. When the vehicle is positioned on the beams the slide 54 may be retracted in readiness for the next pair of beams. The rearward sloping surface of the member 51 is provided so that the members 50 may be reengaged if necessary.

Preferably a pair of walkways 60 are associated with each pair of beams, the right walkway 60 being affixed to the belts 23 and the left walkway being affixed to the movable beam 31 through connecting rods 61. Workmen may therefore work at each side of a vehicle supported upon the endless belt means and will be carried thereby along with the vehicle as it moves successively from left to right toward an end position where the vehicle may be driven off onto the floor 11.

FIG. 3 schematically indicates various shelves 64 and accessories such as grease pumps 65 and the like which may be positioned either on the floor 11 or the intermediate floor 16 so as to be conveniently at hand to workmen at all times.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. A servicing mechanism for vehicles comprising a frame including a spaced pair of opposed side structures,
   a pair of horizontally disposed guideways respectively extending along the upper edges of said side structures,
   support means including a pair of beams extending in parallel relation to each other transversely between said side structures at the level of said guideways and supported by the guideways,
   one of said beams comprising guideway engaging means at each end respectively engaged with said guideways and guided thereby for movement toward and away from the other of said beams,
   belt means secured to the support means for moving the beams as a unit along the guideways,
   and motive means for laterally displacing said one beam with respect to the other whereby vehicles of different tread widths may be driven onto said beams.

2. A servicing mechanism for vehicles comprising a frame including a spaced pair of opposed side structures,
   a pair of horizontally disposed guideways respectively extending along the upper edges of said side structures,
   a pair of beams extendings in parallel relation to each other transversely between said side structures at the level of said guideways,
   one of said beams comprising guideway engaging means at each end respectively engaged with said guideways and guided thereby for movement toward and away from the other of said beams,
   motive means for laterally displacing said one beam with respect to the other whereby vehicles of different tread widths may be driven onto said beams,
   and belt means secured to one beam for moving said pair of beams laterally and the other beam being mounted movably relative to the belt means and supported solely by the guideways and movable relative to the other beam.

3. A servicing mechanism for vehicles comprising a frame including a pair of opposed side structures,
   a pair of guideways respectively extending along the upper edges of said side structures,
   endless belt means mounted on said frame so as to have an upper flight extending longitudinally thereof at the level of said guideways and a return flight at a lower level,
   an operator's platform means positioned below the upper flight and between the side structures,
   power means for driving said belt means in one direction,
   a plurality of first beams fixed to said belt means at regular intervals and extending transversely between said side structures,
   a plurality of second beams respectively paired with said first beams in parallel relation thereto,
   a plurality of guideway engaging means respectively at each end of each of said beams and engaging said guideways for supporting said beams,
   and means adjustably connecting each of said second beams respectively to an adjacent first beam whereby said second beams travel along therewith.

4. A servicing mechanism for vehicles comprising a frame including a pair of opposed side structures,
   a pair of guideways respectively extending along the upper edges of said side structures,
   endless belt means mounted on said frame so as to have an upper flight extending longitudinally thereof at the level of said guideways and a return flight at a lower level,
   an operator's platform positioned below the upper flight and between the side structures,
   power means for driving said belt means in one direction,
   a plurality of first beams fixed to said belt means at regular intervals and extending transversely between said side structures,
   a plurality of second beams respectively paired with said first beams in parallel relation thereto,
   a plurality of guideway engaging means respectively at each end of each of said beams and engaging said guideways for supporting said beams,
   means adjustably connecting each of said second beams respectively to an adjacent first beam whereby said second beams travel along therewith,
   and means for individually adjusting the spacing of said second beams from their respective first beams whereby vehicles of various tread widths may be driven individually onto pairs of said beams for transportation laterally.

5. In a servicing mechanism for vehicles,
   a pair of vertical side frames open therebetween,
   a pair of endless, parallel guide rails carried by the side frames,
   a plurality of pairs of laterally spaced beams extending from guide rail to guide rail and movably supported by the guide rails for supporting the wheels of vehicles above the side frames,
a pair of endless, laterally spaced cog belts connected to the beams,
means guiding the cog belts in parallel paths generally parallel to the guide rails,
a pair of pinions drivingly engaging the cog belts,
and means for driving the pinions in unison.

6. In a servicing mechanism for vehicles,
a pair of parallel, endless guide rails,
a pair of beams,
roller means supported by and movable along the guide rails and supporting for individual movement the beams in parallel positions extending transversely between the guide rails,
endless belt means secured to one of the beams for moving said one of the beams around the guideways,
resilient means connecting the beams together for movement along the guide rails of the other beam by said one of the beams and permitting lateral movement of said other beam toward and away from said one beam,
and means for temporarily moving said other beam laterally of said one beam to permit a vehicle to be driven onto the beams.

7. The servicing mechanism of claim 6 wherein the resilient means includes articulated tow rods, means mounting said other beam slidably on the tow rods, and compression springs on the tow rods urging said other beam away from said one beam.

8. In a servicing mechanism,
a pair of parallel beams,
parallel endless guideways having an upper course and a lower course for guiding the beams therearound,
means urging the beams apart toward first relative positions spaced to permit a vehicle of standard lateral wheel spacing to be driven onto and along the beams and permitting movement of the beams toward each other to second relative positions spaced to permit a vehicle of lateral wheel spacing less than the standard lateral wheel spacing to be driven onto and along the beams,
means for advancing the beams laterally around the guideways, selectively operable means for temporarily stopping the beams in predetermined positions on the upper course of the guideways,
and means for moving the beams to the second relative positions while the beams are temporarily stopped.

9. In a vehicle conveyor providing convenient access to the underside of the vehicle,
a pair of beams adapted to serve as tracks onto which a vehicle may be driven,
means mounting the beams in parallel relationship to define an open, vehicle carrier and permitting lateral adjustment of the beams relative to each other to adapt the carrier to receive vehicles of different tread widths,
selectively operable means for laterally adjusting the positions of the beams relative to each other,
a pair of parallel, upright side frames open therebetween to permit free movement of a mechanic therebetween and therealong,
a pair of parallel endless guideways carried by the side frames in vertical planes and supporting the beams in positions extending between the frames and permitting lateral movement of the beams therealong,
selectively operable means for advancing the beams along the guideways,
selectively operable means for stopping the beams at selected points along the guideways,
and platform means extending between and along the frames at a level below the upper portion of the path of the beams to permit free movement of a mechanic below the upper portion of the path of the beams.

10. In the conveyor of claim 9,
a pair of walkways bracketing the pair of beams and movable therewith to provide access to the upper portions of a vehicle carried by the beams.

References Cited by the Examiner
UNITED STATES PATENTS

| | | | |
|---|---|---|---|
| 1,550,754 | 8/25 | Sockman. | |
| 2,558,832 | 7/51 | Eriksson | 198—137 |
| 2,753,980 | 7/56 | Ballard | 198—174 |
| 2,788,921 | 3/59 | Clark | 198—159 |
| 3,027,991 | 4/62 | Flaherty | 198—177 |

FOREIGN PATENTS

| | | |
|---|---|---|
| 494,168 | 7/53 | Canada. |
| 236,616 | 7/25 | Great Britain. |

SAMUEL F. COLEMAN, *Primary Examiner.*

WILLIAM B. LABORDE, ERNEST A. FALLER,
*Examiners.*